US012681657B2

(12) United States Patent
Xu et al.

(10) Patent No.: US 12,681,657 B2
(45) Date of Patent: Jul. 14, 2026

(54) STORAGE CONTROLLER, DATA READING METHOD AND STORAGE DEVICE

(71) Applicant: Hefei Core Storage Electronic Limited, Anhui (CN)

(72) Inventors: Zhenyu Xu, Jiangxi (CN); Kuai Cao, Anhui (CN); Yuting Niu, Anhui (CN); Tsung-Lin Wu, Hsinchu City (TW); Qi-Ao Zhu, Anhui (CN)

(73) Assignee: Hefei Core Storage Electronic Limited, Anhui (CN)

( * ) Notice: Subject to any disclaimer, the term of this patent is extended or adjusted under 35 U.S.C. 154(b) by 150 days.

(21) Appl. No.: 18/808,107

(22) Filed: Aug. 19, 2024

(65) Prior Publication Data

US 2025/0244901 A1 Jul. 31, 2025

(30) Foreign Application Priority Data

Jan. 25, 2024 (CN) .......................... 202410101913.6

(51) Int. Cl.
G06F 3/06 (2006.01)
(52) U.S. Cl.
CPC .......... G06F 3/0643 (2013.01); G06F 3/0604 (2013.01); G06F 3/0679 (2013.01)
(58) Field of Classification Search
None
See application file for complete search history.

(56) References Cited

U.S. PATENT DOCUMENTS

| | | | | |
|---|---|---|---|---|
| 11,269,783 | B2 * | 3/2022 | Hsu | .................... G06F 12/0246 |
| 2015/0046670 | A1 | 2/2015 | Kim et al. | |
| 2017/0083451 | A1 * | 3/2017 | Tan | .................... G06F 12/0246 |
| 2018/0088863 | A1 * | 3/2018 | Lee | ....................... G06F 3/0679 |
| 2021/0042050 | A1 | 2/2021 | Schauer et al. | |

(Continued)

FOREIGN PATENT DOCUMENTS

| | | |
|---|---|---|
| CN | 102110056 | 6/2011 |
| CN | 106557432 | 4/2017 |

(Continued)

OTHER PUBLICATIONS

"Office Action of Taiwan Counterpart Application", issued on May 6, 2025, p. 1-p. 4.

*Primary Examiner* — Yaima Rigol
(74) *Attorney, Agent, or Firm* — JCIPRNET

(57) ABSTRACT

A storage controller, a data reading method and a storage device. data reading method: identifying a plurality of logical addresses corresponding to files based on file read commands; determining a plurality of mapping tables corresponding to files based on logical addresses; loading a first mapping table corresponding to a first file to a first memory section of a buffer memory; identifying one or more second logical addresses of one or more second files corresponding to first mapping table among files or than first file; determining target content of first mapping table based on one or more second logical addresses, and copying target content to a second memory section of buffer memory; and from target content, finding a fourth physical address corresponding to a fourth logical address of a fourth file among second files, to read fourth data of fourth file, so as to respond to a fourth file read command.

15 Claims, 6 Drawing Sheets

(56)     References Cited

U.S. PATENT DOCUMENTS

| | | | |
|---|---|---|---|
| 2023/0046402 A1* | 2/2023 | Tan | G06F 12/0868 |
| 2023/0083104 A1 | 3/2023 | Xiang et al. | |
| 2023/0104892 A1* | 4/2023 | Lee | G06F 3/0631 |
| | | | 711/103 |
| 2024/0061772 A1* | 2/2024 | Meeramohideen Mohamed | |
| | | | G06F 3/0676 |
| 2024/0319919 A1* | 9/2024 | Park | G06F 3/0679 |

FOREIGN PATENT DOCUMENTS

| | | |
|---|---|---|
| CN | 113094307 | 7/2021 |
| TW | 201738751 | 11/2017 |
| TW | 202008171 | 2/2020 |
| TW | 1772466 | 8/2022 |

* cited by examiner

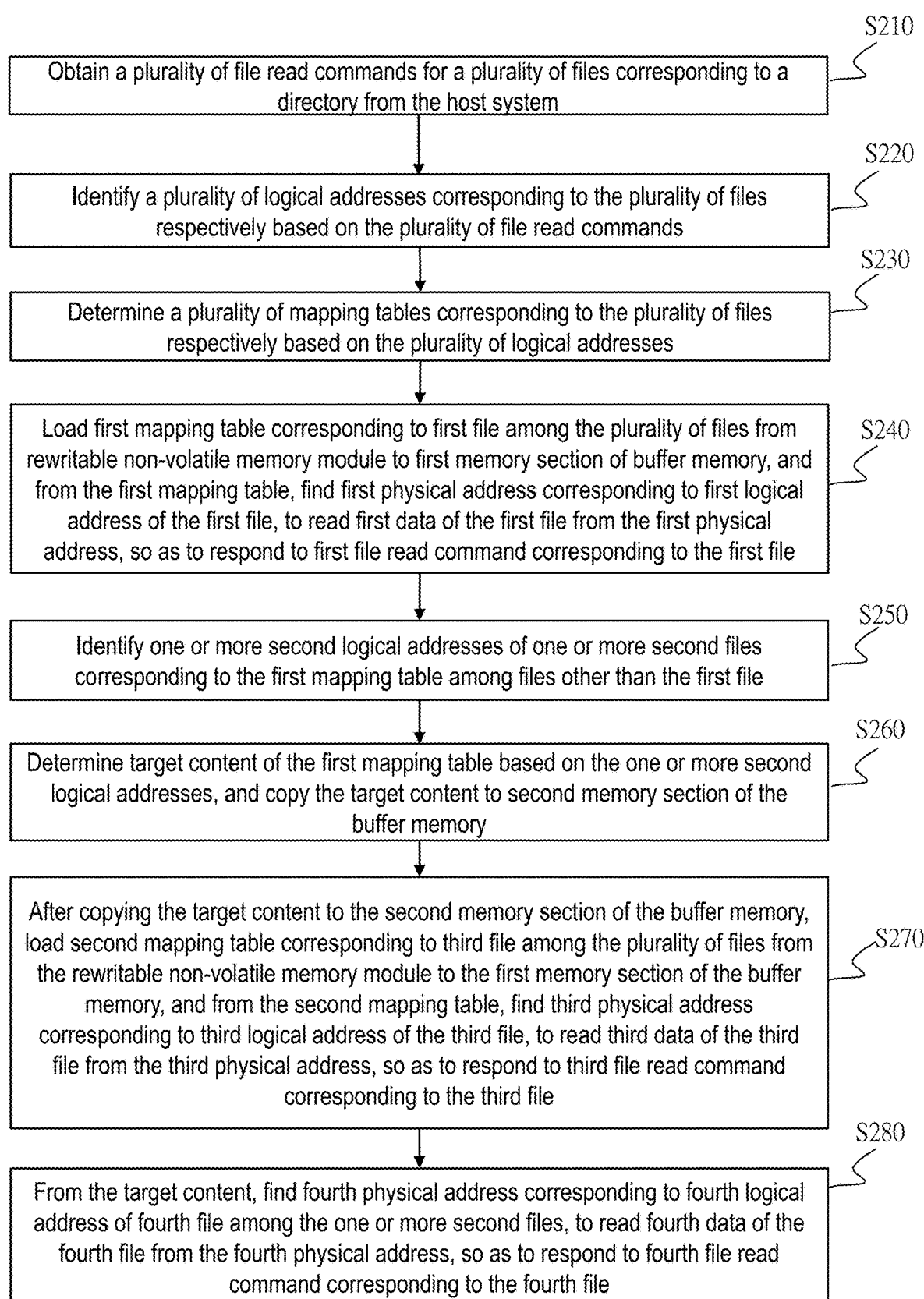

S210

Obtain a plurality of file read commands for a plurality of files corresponding to a directory from the host system

S220

Identify a plurality of logical addresses corresponding to the plurality of files respectively based on the plurality of file read commands

S230

Determine a plurality of mapping tables corresponding to the plurality of files respectively based on the plurality of logical addresses

S240

Load first mapping table corresponding to first file among the plurality of files from rewritable non-volatile memory module to first memory section of buffer memory, and from the first mapping table, find first physical address corresponding to first logical address of the first file, to read first data of the first file from the first physical address, so as to respond to first file read command corresponding to the first file

S250

Identify one or more second logical addresses of one or more second files corresponding to the first mapping table among files other than the first file

S260

Determine target content of the first mapping table based on the one or more second logical addresses, and copy the target content to second memory section of the buffer memory

S270

After copying the target content to the second memory section of the buffer memory, load second mapping table corresponding to third file among the plurality of files from the rewritable non-volatile memory module to the first memory section of the buffer memory, and from the second mapping table, find third physical address corresponding to third logical address of the third file, to read third data of the third file from the third physical address, so as to respond to third file read command corresponding to the third file

S280

From the target content, find fourth physical address corresponding to fourth logical address of fourth file among the one or more second files, to read fourth data of the fourth file from the fourth physical address, so as to respond to fourth file read command corresponding to the fourth file

FIG. 2

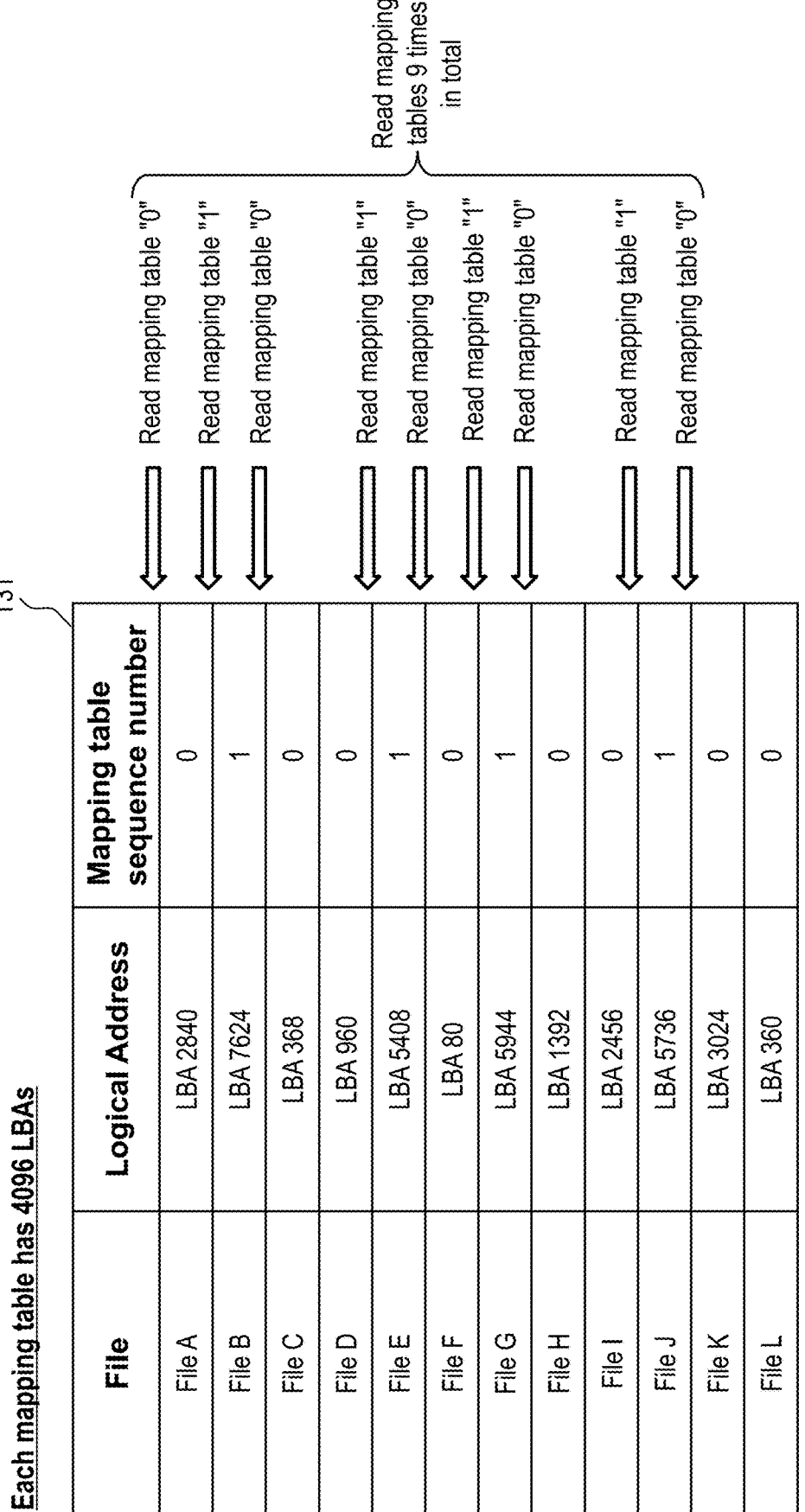

Each mapping table has 4096 LBAs

| File | Logical Address | Mapping table sequence number | |
|------|-----------------|-------------------------------|---|
| File A | LBA 2840 | 0 | Read mapping table "0" |
| File B | LBA 7624 | 1 | Read mapping table "1" |
| File C | LBA 368 | 0 | Read mapping table "0" |
| File D | LBA 960 | 0 | Read mapping table "1" |
| File E | LBA 5408 | 1 | Read mapping table "0" |
| File F | LBA 80 | 0 | Read mapping table "1" |
| File G | LBA 5944 | 1 | Read mapping table "0" |
| File H | LBA 1392 | 0 | |
| File I | LBA 2456 | 0 | Read mapping table "1" |
| File J | LBA 5736 | 1 | Read mapping table "0" |
| File K | LBA 3024 | 0 | |
| File L | LBA 360 | 0 | |

T31

Read mapping tables 9 times in total

FIG. 3

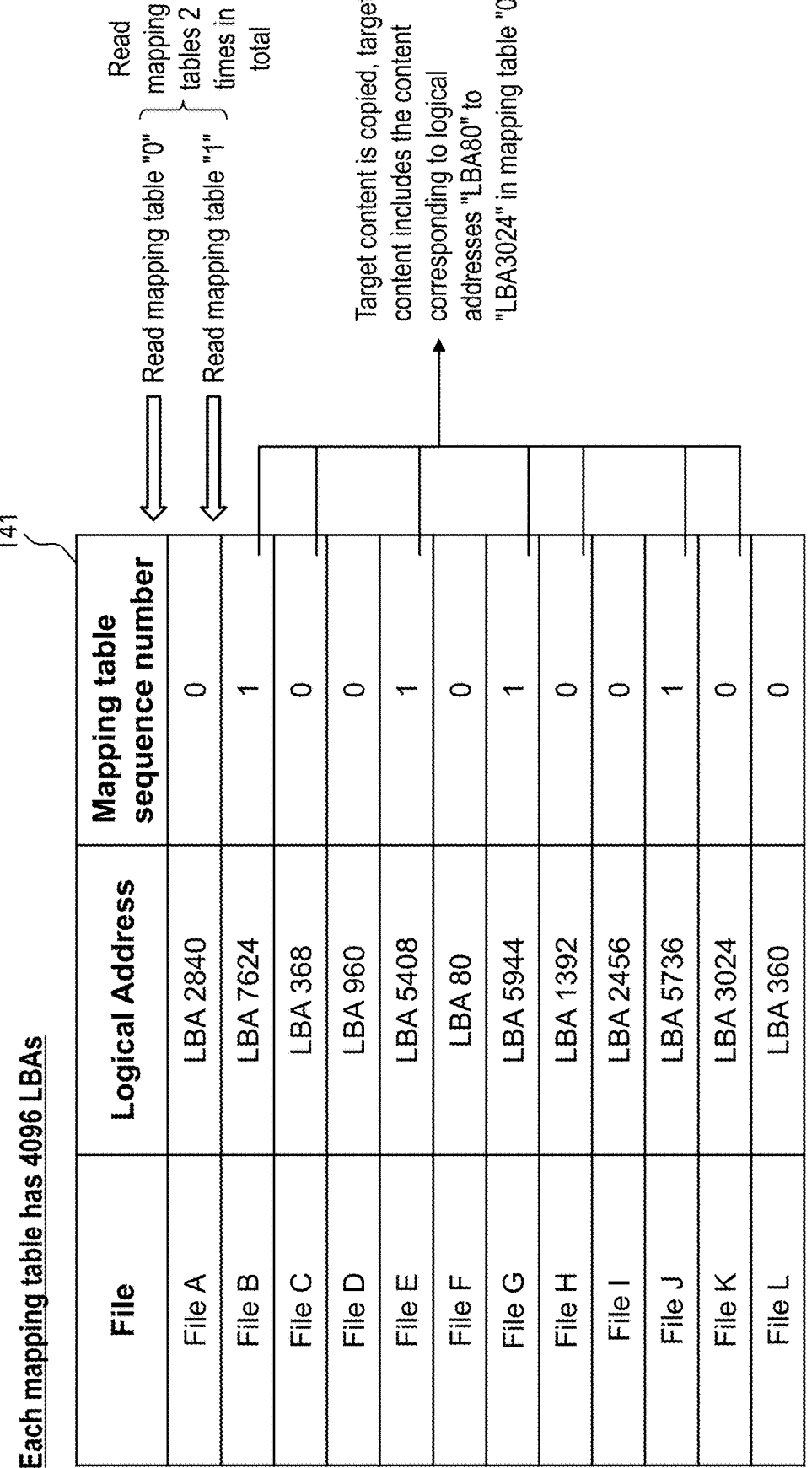

Each mapping table has 4096 LBAs

T41

| File | Logical Address | Mapping table sequence number |
|------|-----------------|-------------------------------|
| File A | LBA 2840 | 0 |
| File B | LBA 7624 | 1 |
| File C | LBA 368 | 0 |
| File D | LBA 960 | 0 |
| File E | LBA 5408 | 1 |
| File F | LBA 80 | 0 |
| File G | LBA 5944 | 1 |
| File H | LBA 1392 | 0 |
| File I | LBA 2456 | 0 |
| File J | LBA 5736 | 1 |
| File K | LBA 3024 | 0 |
| File L | LBA 360 | 0 |

Read mapping table "0"
Read mapping table "1"
} Read mapping tables 2 times in total Target content is copied, target content includes the content corresponding to logical addresses "LBA80" to "LBA3024" in mapping table "0"

FIG. 4A

STORAGE CONTROLLER, DATA READING METHOD AND STORAGE DEVICE

CROSS-REFERENCE TO RELATED APPLICATION

This application claims the priority benefit of China application serial no. 202410101913.6, filed on Jan. 25, 2024. The entirety of the above-mentioned patent application is hereby incorporated by reference herein and made a part of this specification.

BACKGROUND

Technical Field

The present invention relates to a memory management technology, particularly to a data reading method for a non-volatile memory, and a storage device and a storage controller using the method.

Description of Related Art

Non-volatile memory refers to computer memory that retains stored data even when power is turned off. It has advantages such as data non-volatility, power saving, small size, and no mechanical structure, and is widely used in various electronic devices.

Currently, flash-type non-volatile memory typically uses logical address (LBA) addressing. When reading data from a certain LBA, the storage device first loads the mapping table containing that LBA, then finds the physical address (PBA) corresponding to that LBA in the mapping table, and then reads the data according to that PBA. As the capacity of non-volatile memory increases, the total number of LBAs increases, which in turn requires the use of multiple mapping tables to record all LBAs. When reading a large number of files, since these files are stored in discontinuous and random LBAs, when these LBAs are not in the same mapping table, it will result in the need to load multiple mapping tables, which increases the reading time and ultimately leads to a decrease in reading speed.

When a user needs to read a large number of file directories and the files and directory entries under them, it may cause files or directory entries on the same mapping table to not necessarily be adjacent or continuous in order in the file system. When reading data from a certain LBA, the storage device usually first loads the mapping table containing that LBA, then finds the PBA corresponding to that LBA in the mapping table, and then reads the data according to that PBA. Therefore, when reading an LBA, if the mapping table containing that LBA has not been loaded into the RAM of the storage device before, the storage device needs to perform an additional operation of loading the mapping table, thus reducing the speed of reading data. This process may have an adverse effect on the data reading speed.

SUMMARY

The purpose of the present invention is to solve the above problems and improve the efficiency of non-volatile memory during large-scale reading operations. To this end, the present disclosure provides an optimized reading method that allows the storage device to more effectively retain/copy the mapping table content that will be used to avoid being overwritten by other loaded mapping tables afterwards, reducing the number of times mapping tables are repeatedly loaded, thereby improving reading speed.

An embodiment of the present invention provides a storage controller for controlling a storage device configured with a rewritable non-volatile memory module. The storage controller includes: a memory interface control circuit, a buffer memory, and a processor. The memory interface control circuit is coupled to the rewritable non-volatile memory module, wherein the rewritable non-volatile memory module comprises a plurality of memory dies, wherein each of the memory dies has a plurality of physical blocks, each of the physical blocks has a plurality of physical pages, and the plurality of physical pages correspond to a plurality of physical addresses respectively. The processor is coupled to the memory interface control circuit and the buffer memory, wherein the processor is further coupled to a connection interface circuit of the storage device to be coupled to a host system. The processor is configured to obtain a plurality of file read commands for a plurality of files corresponding to a directory from the host system, wherein the processor is further configured to identify a plurality of logical addresses corresponding to the plurality of files respectively based on the plurality of file read commands, wherein the processor is further configured to determine a plurality of mapping tables corresponding to the plurality of files respectively based on the plurality of logical addresses. Additionally, the processor is further configured to load a first mapping table corresponding to a first file among the plurality of files from the rewritable non-volatile memory module to a first memory section of the buffer memory, and from the first mapping table, find a first physical address corresponding to a first logical address of the first file, to read first data of the first file from the first physical address, so as to respond to a first file read command corresponding to the first file. The processor is further configured to identify one or more second logical addresses of one or more second files corresponding to the first mapping table among the files other than the first file, wherein the processor is further configured to determine target content of the first mapping table based on the one or more second logical addresses, and copy the target content to a second memory section of the buffer memory. After copying the target content to the second memory section of the buffer memory, the processor is further configured to load a second mapping table corresponding to a third file among the plurality of files from the rewritable non-volatile memory module to the first memory section of the buffer memory, and from the second mapping table, find a third physical address corresponding to a third logical address of the third file, to read third data of the third file from the third physical address, so as to respond to a third file read command corresponding to the third file, wherein the second mapping table is different from the first mapping table, and the second mapping table overwrites the first mapping table in the buffer memory. The processor is further configured to, from the target content, find a fourth physical address corresponding to a fourth logical address of a fourth file among the one or more second files, to read fourth data of the fourth file from the fourth physical address, so as to respond to a fourth file read command corresponding to the fourth file.

Another embodiment of the present invention provides a data reading method for a storage controller to read a rewritable non-volatile memory module. The rewritable non-volatile memory module comprises a plurality of memory dies, wherein each of the memory dies has a plurality of physical blocks, each of the physical blocks has a plurality of physical pages, and the plurality of physical pages correspond to a plurality of physical addresses respectively. The method includes: obtaining a plurality of file read commands for a plurality of files corresponding to a directory from the host system; identifying a plurality of logical addresses corresponding to the plurality of files respectively based on the plurality of file read commands; determining a plurality of mapping tables corresponding to the plurality of files respectively based on the plurality of logical addresses; loading a first mapping table corresponding to a first file among the plurality of files from the rewritable non-volatile memory module to a first memory section of a buffer memory of the storage controller, and from the first mapping table, finding a first physical address corresponding to a first logical address of the first file, to read first data of the first file from the first physical address, so as to respond to a first file read command corresponding to the first file; identifying one or more second logical addresses of one or more second files corresponding to the first mapping table among the files other than the first file; determining target content of the first mapping table based on the one or more second logical addresses, and copying the target content to a second memory section of the buffer memory; after copying the target content to the second memory section of the buffer memory, loading a second mapping table corresponding to a third file among the plurality of files from the rewritable non-volatile memory module to the first memory section of the buffer memory, and from the second mapping table, finding a third physical address corresponding to a third logical address of the third file, to read third data of the third file from the third physical address, so as to respond to a third file read command corresponding to the third file, wherein the second mapping table is different from the first mapping table, and the second mapping table overwrites the first mapping table in the buffer memory; and from the target content, finding a fourth physical address corresponding to a fourth logical address of a fourth file among the one or more second files, to read fourth data of the fourth file from the fourth physical address, so as to respond to a fourth file read command corresponding to the fourth file.

Another embodiment of the present invention provides a storage device, including a connection interface circuit, a rewritable non-volatile memory module, and a storage controller. The connection interface circuit is configured to be coupled to a host system. The rewritable non-volatile memory module comprises a plurality of memory dies, wherein each of the memory dies has a plurality of physical blocks, each of the physical blocks has a plurality of physical pages, and the plurality of physical pages correspond to a plurality of physical addresses respectively. The storage controller is coupled to the connection interface circuit and the rewritable non-volatile memory module. The storage controller is configured to obtain a plurality of file read commands for a plurality of files corresponding to a directory from the host system, wherein the storage controller is further configured to identify a plurality of logical addresses corresponding to the plurality of files respectively based on the plurality of file read commands, wherein the storage controller is further configured to determine a plurality of mapping tables corresponding to the plurality of files respectively based on the plurality of logical addresses. The storage controller is further configured to load a first mapping table corresponding to a first file among the plurality of files from the rewritable non-volatile memory module to a first memory section of a buffer memory of the storage controller, and from the first mapping table, find a first physical address corresponding to a first logical address of the first file, to read first data of the first file from the first physical address, so as to respond to a first file read command corresponding to the first file. The storage controller is further configured to identify one or more second logical addresses of one or more second files corresponding to the first mapping table among the files other than the first file, wherein the storage controller is further configured to determine target content of the first mapping table based on the one or more second logical addresses, and copy the target content to a second memory section of the buffer memory. After copying the target content to the second memory section of the buffer memory, the storage controller is further configured to load a second mapping table corresponding to a third file among the plurality of files from the rewritable non-volatile memory module to the first memory section of the buffer memory, and from the second mapping table, find a third physical address corresponding to a third logical address of the third file, to read third data of the third file from the third physical address, so as to respond to a third file read command corresponding to the third file, wherein the second mapping table is different from the first mapping table, and the second mapping table overwrites the first mapping table in the buffer memory. The storage controller is further configured to, from the target content, find a fourth physical address corresponding to a fourth logical address of a fourth file among the one or more second files, to read fourth data of the fourth file from the fourth physical address, so as to respond to a fourth file read command corresponding to the fourth file.

Based on the above, the storage device, storage controller, and data reading method used by the storage controller provided by the embodiments of the present invention can effectively avoid the problem of target content being overwritten in subsequent operations of loading other mapping tables by copying the target content of the current mapping table corresponding to the subsequent files of the specified directory. In this way, the physical addresses of other files in the specified directory can be queried through the target content, thus avoiding the trouble of repeatedly loading mapping tables. This innovation reduces the number of times mapping tables are repeatedly read, significantly improves the data reading efficiency of the storage device and storage controller, and rapidly enhances the data reading speed for all files in the specified directory. By adopting this technical means, the storage system can more efficiently handle reading operations for a large number of file directories and the files and directory entries under them. This method not only saves the time for the storage device to load mapping tables but also reduces the reading burden of the system, providing users with a faster and smoother data reading experience. This technological innovation performs excellently in large-scale data reading operations, bringing new progress to the technological development in the storage field.

BRIEF DESCRIPTION OF THE DRAWINGS

FIG. 2 is a flow chart of a data reading method according to an embodiment of the present invention.

FIG. 3 is a schematic diagram of a conventional method of looking up/reading mapping tables.

FIG. 4A is a schematic diagram showing the reduction of repeated loading of mapping tables by copying target content according to an embodiment of the present invention.

DESCRIPTION OF THE EMBODIMENTS

Figure 1:
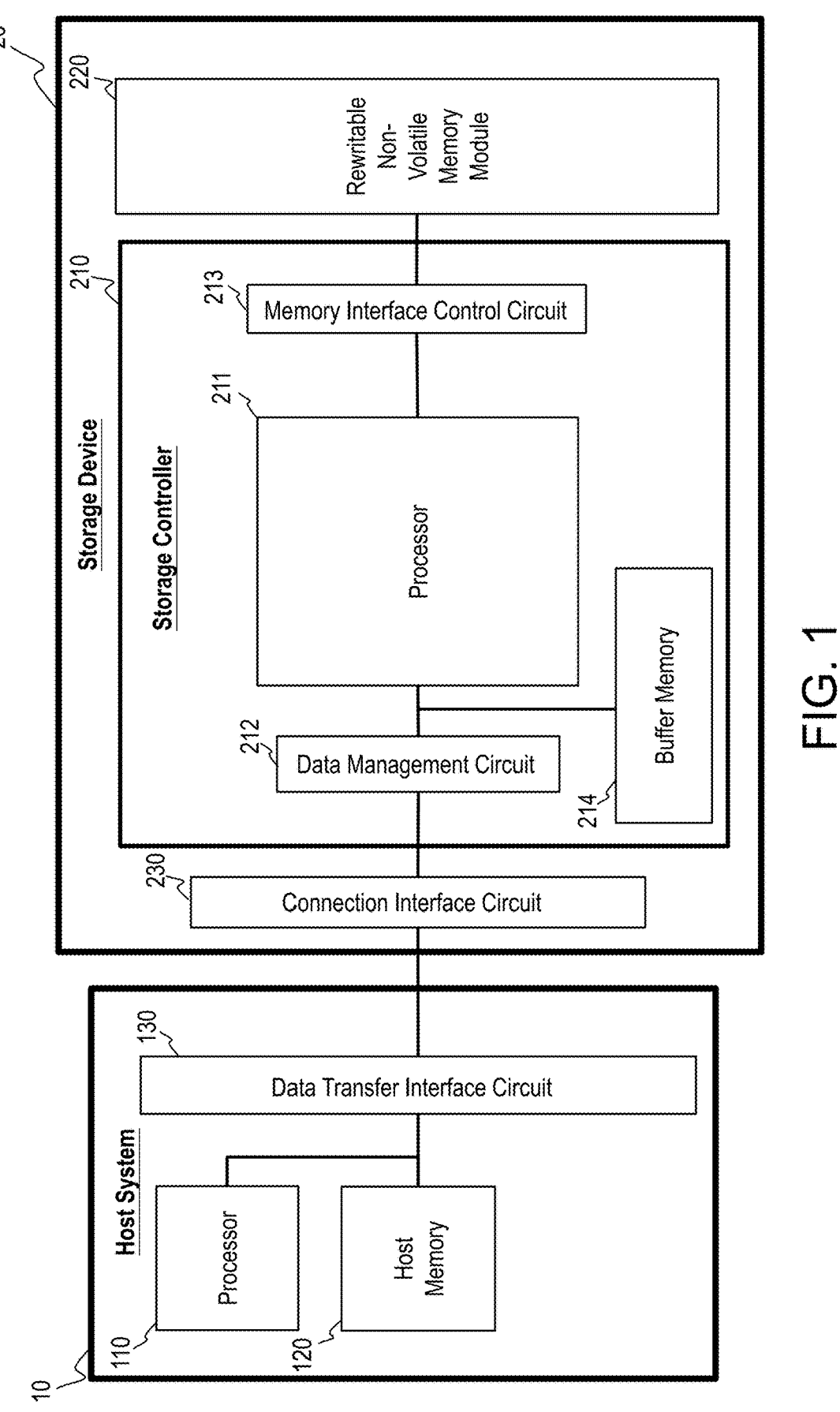
FIG. 1 is a block diagram of a host system and a storage device according to an embodiment of the present invention.

Reference will now be made in detail to exemplary embodiments of the invention, examples of which are illustrated in the accompanying drawings. Wherever possible, the same reference numbers are used in the drawings and the description to refer to the same or like parts.

FIG. 1 is a block diagram of a host system and a storage device according to an embodiment of the present invention. Please refer to FIG. 1, the host system 10 is, for example, a personal computer, a notebook computer, or a server. The host system 10 includes a processor 110, a host memory 120, and a data transfer interface circuit 130. In this embodiment, the processor 110 is coupled to (also referred to as electrically connected to) the host memory 120 and the data transfer interface circuit 130. In another embodiment, the processor 110, the host memory 120, and the data transfer interface circuit 130 are coupled to each other via a system bus. In this embodiment, the processor 110, the host memory 120, and the data transfer interface circuit 130 can be disposed on a motherboard of the host system 10.

The storage device 20 includes a storage controller 210, a rewritable non-volatile memory module 220, and a connection interface circuit 230. The storage controller 210 includes a processor 211, a data management circuit 212, and a memory interface control circuit 213.

In this embodiment, the host system 10 performs data access operations by coupling to the storage device 20 through the data transfer interface circuit 130 and the connection interface circuit 230 of the storage device 20. For example, the host system 10 can store data to the storage device 20 or read data from the storage device 20 via the data transfer interface circuit 130.

In this embodiment, the number of the data transfer interface circuit 130 can be one or more. Through the data transfer interface circuit 130, the motherboard can be coupled to the storage device 20 via wired or wireless means. The storage device 20 can be, for example, a USB flash drive, a memory card, a solid state drive (SSD), or a wireless memory storage device. The wireless memory storage device can be, for example, a Near Field Communication (NFC) memory storage device, a WiFi memory storage device, a Bluetooth memory storage device, or a low power Bluetooth memory storage device (e.g., iBeacon) or other memory storage devices based on various wireless communication technologies. In addition, the motherboard can also be coupled to various I/O devices such as a Global Positioning System (GPS) module, a network interface card, a wireless transmission device, a keyboard, a screen, a speaker, etc. via the system bus.

In this embodiment, the data transfer interface circuit 130 and the connection interface circuit 230 are interface circuits compatible with the Peripheral Component Interconnect Express (PCI Express) standard. Moreover, the data transfer interface circuit 130 and the connection interface circuit 230 use the Non-Volatile Memory Express (NVMe) communication protocol for data transmission.

Furthermore, in another embodiment, the connection interface circuit 230 can be packaged in a chip with the storage controller 210, or the connection interface circuit 230 is disposed outside a chip containing the storage controller 210.

In this embodiment, the host memory 120 is used to temporarily store instructions or data executed by the processor 110. For example, in this embodiment, the host memory 120 can be a Dynamic Random Access Memory (DRAM), a Static Random Access Memory (SRAM), etc. However, it must be understood that the present invention is not limited to this, and the host memory 120 can also be other suitable memories.

The storage controller 210 is used to execute multiple logic gates or control instructions implemented in hardware form or firmware form and perform operations such as writing, reading, and erasing data in the rewritable non-volatile memory module 220 according to the instructions of the host system 10.

More specifically, the processor 211 in the storage controller 210 is hardware with computational capabilities, which is used to control the overall operation of the storage controller 210. Specifically, the processor 211 is programmed by multiple control instructions/program codes, and when the storage device 20 operates, these control instructions/program codes will be executed to perform operations such as writing, reading, and erasing data. In addition, in this embodiment, the control instructions/program codes can be further executed to perform data reading operations to implement the data reading method provided by the present invention. The control instructions/program codes corresponding to the data reading method can be further implemented as hardware circuit units to implement the data reading method provided by the present invention.

It is worth mentioning that, in this embodiment, the processor 110 and the processor 211 are, for example, a Central Processing Unit (CPU), a microprocessor, or other programmable general-purpose or special-purpose microprocessors, digital signal processors (DSP), programmable controllers, Application Specific Integrated Circuits (ASIC), Programmable Logic Devices (PLD), or other similar circuit components. The present invention is not limited hereto.

In this embodiment, as mentioned above, the storage controller 210 also includes a data management circuit 212 and a memory interface control circuit 213. It should be noted that the operations performed by various parts of the storage controller 210 can also be considered as operations performed by the storage controller 210.

Wherein, the data management circuit 212 is coupled to the processor 211, the memory interface control circuit 213, and the connection interface circuit 230. The data management circuit 212 is used to transfer data according to the instructions of the processor 211. For example, it reads data from the host system 10 (such as the host memory 120) via the connection interface circuit 230, and writes the read data to the rewritable non-volatile memory module 220 via the memory interface control circuit 213 (for example, performing a write operation according to a write instruction from the host system 10). Another example is reading data from one or more physical units of the rewritable non-volatile memory module 220 via the memory interface control circuit 213 (data can be read from one or more storage units in one or more physical units), and writing the read data to the host system 10 (such as the host memory 120) via the connection interface circuit 230 (for example, performing a read operation according to a read instruction from the host system 10). In another embodiment, the data management circuit 212 can also be integrated into the processor 211.

The memory interface control circuit 213 is used to accept instructions from the processor 211 and cooperate with the data management circuit 212 to perform write (also called programming) operations, read operations, or erase operations on the rewritable non-volatile memory module 220.

In addition, the data to be written to the rewritable non-volatile memory module 220 will be converted into a format acceptable to the rewritable non-volatile memory module 220 through the memory interface control circuit 213. Specifically, if the processor 211 wants to access the rewritable non-volatile memory module 220, the processor 211 will transmit corresponding instruction sequences to the memory interface control circuit 213 to instruct the memory interface control circuit 213 to perform corresponding operations. For example, these instruction sequences may include write instruction sequences for instructing to write data, read instruction sequences for instructing to read data, erase instruction sequences for instructing to erase data, and corresponding instruction sequences for instructing various memory operations. These instruction sequences may include one or more signals, or data on the bus. These signals or data may include instruction codes or program codes. For example, in the read instruction sequence, it will include information such as read identification code, memory address, physical address, etc.

In addition, the storage controller 210 will establish a logical to physical address mapping table and a physical to logical address mapping table to record the address mapping relationship between the logical units (such as logical blocks, logical pages, or logical columns) and physical units (such as physical erase units/physical blocks, physical pages, physical columns) configured for the rewritable non-volatile memory module 220. In other words, the storage controller 210 can find a physical unit mapped by a logical unit through the logical to physical address mapping table (also called as a mapping table) (such as finding a physical page mapped by a logical page; finding a physical address mapped by a logical address), and the storage controller 210 can find a logical unit mapped by a physical unit through the physical to logical address mapping table (such as finding a logical page mapped by a physical page; finding a logical address mapped by a physical address). However, the above technical concepts regarding the mapping between logical addresses and physical addresses are common technical means for those skilled in the art and are not the technical solutions that the present invention intends to elaborate, so they will not be described in detail here.

In one embodiment, the storage controller 210 also includes a buffer memory 214. The buffer memory 214 is coupled to the processor 211 and is used to temporarily store data and instructions from the host system 10, data from the rewritable non-volatile memory module 220, or other system data for managing the storage device 20 (such as target content in the mapping table to be retained), so that the processor 211 can quickly access the data, instructions, or system data from the buffer memory 214.

The rewritable non-volatile memory module 220 is coupled to the storage controller 210 (memory interface control circuit 213) and is used to store the data written by the host system 10.

In this embodiment, the rewritable non-volatile memory module 220 has multiple word lines, each of word lines is coupled to multiple storage units, also called columns (also called physical columns). Multiple columns on the same word line form a physical programming unit (also called a physical page). Each physical page corresponds to a physical address, which is used to record the location of the data stored in the physical page. In addition, multiple physical pages can form a physical block (also called a physical erase unit). Each memory die of the multiple memory dies of the rewritable non-volatile memory module has multiple physical blocks. It should be noted that the present invention does not limit the size of each physical page and logical page.

Figure 5:
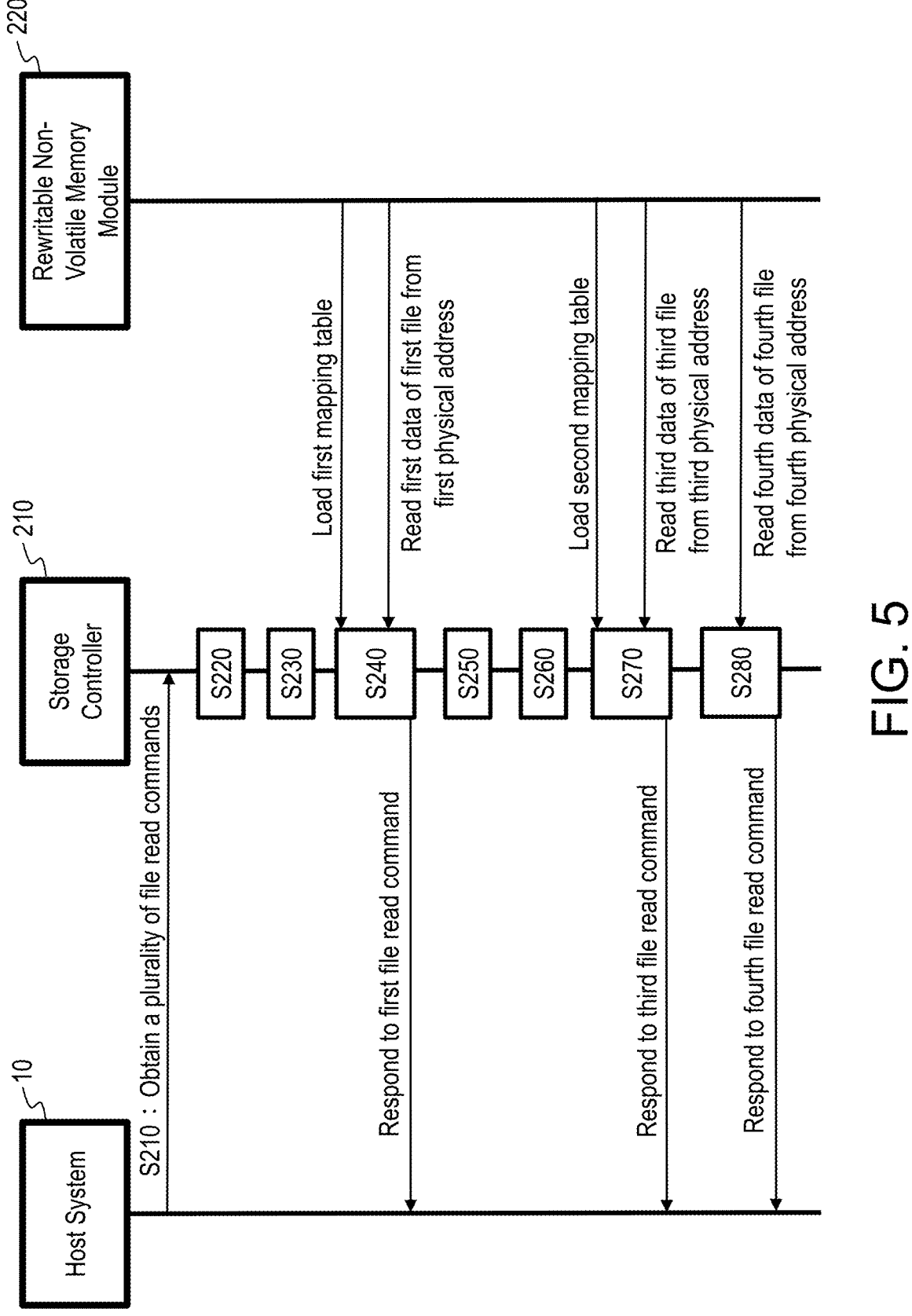
FIG. 5 is a flow diagram of a data reading method according to an embodiment of the present invention.

FIG. 2 is a flow chart of a data reading method according to an embodiment of the present invention. FIG. 5 is a flow diagram of a data reading method according to an embodiment of the present invention. Please refer to FIG. 2 and FIG. 5 simultaneously. In step S210, the storage controller 210 (processor 211) obtains a plurality of file read commands for a plurality of files corresponding to a directory from the host system 10. In one embodiment, the host system 10 issues a directory read command corresponding to a specified directory to the storage controller 210, allowing the storage controller 210 to parse the directory read command and obtain the plurality of file read commands corresponding to the plurality of files in the specified directory. In another embodiment, the plurality of file read commands can also correspond to multiple files in different directories.

In step S220, the storage controller 210 identifies a plurality of logical addresses corresponding to the plurality of files respectively based on the plurality of file read commands. In one embodiment, each file read command includes, for example, a file identification code, a logical address corresponding to the file, and a data size.

In step S230, the storage controller 210 determines a plurality of mapping tables corresponding to the plurality of files respectively based on the plurality of logical addresses. Specifically, in one embodiment, the storage controller 210 calculates a sequence number of a target mapping table corresponding to a target file among the plurality of files based on a predetermined number of logical addresses for each mapping table and a target logical address of the target file. Then, the processor determines the target mapping table corresponding to the target file based on the sequence number of the target mapping table. More specifically, the storage controller 210 divides the target logical address by the predetermined number of logical addresses to obtain a quotient. Then, the storage controller 210 takes the obtained quotient as the sequence number of the target mapping table corresponding to the target file.

For example, please refer to FIG. 3 and FIG. 4A. Assuming that each mapping table can store 4096 logical addresses (LBAs), and assuming that the storage controller 210 can identify the corresponding files A-L and the logical address of each file based on the plurality of file read commands (as shown in tables T31, T41).

In this example, the storage controller 210 can simply determine the mapping table recording the logical address and its sequence number based on the logical address of each file. For example, as shown in table T31, based on the logical address "LBA 2840" of file A, the quotient obtained by dividing 2840 by 4096 is 0, so the storage controller 210 can determine that the physical address mapped by the logical address "2840" is recorded in the mapping table (logical to physical mapping table) with sequence number "0". Another example is that the logical address "LBA 7624" of file B corresponds to mapping table "1". The sequence number "1" of this mapping table is the quotient value "1" obtained by dividing the logical address 7624 by 4096, that is, the physical address mapped by the logical address "7624" is recorded in the mapping table (logical to physical mapping table) with sequence number "1".

After determining the plurality of mapping tables, in step S240, the storage controller 210 loads a first mapping table

9 | 10 corresponding to a first file among the plurality of files from the rewritable non-volatile memory module 220 to a first memory section of the buffer memory 214 of the storage controller 210, and from the first mapping table, finds a first physical address corresponding to a first logical address of the first file, to read first data of the first file from the first physical address, so as to respond to a first file read command corresponding to the first file.

In step S250, the storage controller 210 identifies one or more second logical addresses of one or more second files corresponding to the first mapping table among the files other than the first file. That is, the storage controller 210 will determine whether the logical addresses corresponding to other files besides the first file will also use the currently loaded first mapping table, to determine whether to decide the target content in the corresponding mapping table. If so, the storage controller 210 will identify other files (such as one or more second files) in the specified directory that also correspond to the currently loaded first mapping table, and will then determine the target content in the first mapping table based on the logical addresses of the one or more second files. A second file refers to a file (other than the first file) whose corresponding mapping table is the currently loaded mapping table, that is, if a file's logical address (second logical address) can be queried through the first mapping table, then this file can be identified as a second file. On the contrary, in another embodiment, if it is determined that the other files besides the first file will not use the currently loaded first mapping table, the storage controller 210 determines that the one or more second files do not exist, and there is no need to determine the corresponding target content.

Then, in step S260, the storage controller 210 determines target content of the first mapping table based on the one or more second logical addresses, and copies the target content to a second memory section of the buffer memory 214.

More specifically, in one embodiment, in the operation of determining the target content of the first mapping table based on the one or more second logical addresses, the storage controller 210 identifies a minimum second logical address and a maximum second logical address according to the order (such as the amount of LBA values) of the one or more second logical addresses, wherein the storage controller 210 takes content of a plurality of logical addresses between the minimum second logical address and the maximum second logical address in the first mapping table as the target content. In other words, the storage controller 210 will not copy/retain the entire content of the first mapping table, but will only copy the mapping content/section that will be used by the second files (of the second logical addresses) to be read subsequently. For example, assuming that the first mapping table records the mapping content of 1024 physical addresses mapped to logical addresses "LBA 0" to "LBA 1023". And assuming that among the one or more second logical addresses, the minimum second logical address is "LBA 500" and the maximum second logical address is "LBA 800", then the storage controller 210 can copy/retain the target content of multiple physical addresses mapped to logical addresses "LBA500" to logical addresses "LBA800" to the second memory section of the buffer memory 214. In this way, the physical addresses mapped to the second logical addresses corresponding to all second files can be found through the copied/retained target content, without needing to repeatedly load/read the first mapping table to find the physical addresses mapped to the second logical addresses corresponding to all second files.

However, in another embodiment, the storage controller 210 takes the content corresponding to the one or more second logical addresses in the first mapping table as the target content based on the one or more second logical addresses. That is, the storage controller 210 can directly copy the content of the first mapping table corresponding to the second logical addresses of the subsequent second files to the second memory section of the buffer memory 214. Mapping content that is not needed will not be copied/retained. For example, assuming that the first mapping table records the mapping content of 1024 physical addresses mapped to logical addresses "LBA 0" to logical addresses "LBA 1023". And assuming that there are three second files corresponding to the first mapping table, and the corresponding second logical addresses are "LBA 500", "LBA 700" and "LBA 800", then the storage controller 210 can directly copy/retain the target content of three physical addresses mapped to logical addresses "LBA 500", "LBA 700" and "LBA 800" to the second memory section of the buffer memory 214. There is no need to copy the mapping content corresponding to logical addresses "LBA 500" to "LBA 800" in the first mapping table. In this way, it can further save the space of the second memory section of the buffer memory 214.

In step S270, after copying the target content to the second memory section of the buffer memory 214, the storage controller 210 loads a second mapping table corresponding to a third file among the plurality of files from the rewritable non-volatile memory module 220 to the first memory section of the buffer memory 214, and from the second mapping table, finds a third physical address corresponding to a third logical address of the third file, to read third data of the third file from the third physical address, so as to respond to a third file read command corresponding to the third file. The second mapping table is different from the first mapping table, and the second mapping table overwrites the first mapping table in the buffer memory 214. That is, in order to process the third file read command corresponding to the third file, the storage controller 210 determines that the second mapping table corresponding to the third logical address of the third file is different from the mapping table currently loaded in the first memory section, so the storage controller 210 will load the second mapping table from the rewritable non-volatile memory module 220 to the first memory section of the buffer memory 214.

Similar to the above step of determining whether to decide the target content, in one embodiment, the storage controller 210 will also determine whether the logical addresses corresponding to other files besides the third file will also use the currently loaded second mapping table. If so, the storage controller 210 will identify other files (such as one or more fifth files) that also correspond to the currently loaded second mapping table, and will then determine another target content in the second mapping table based on the logical addresses of the one or more fifth files. Here, a fifth file refers to a file whose corresponding mapping table is the currently loaded second mapping table. On the contrary, in another embodiment, if it is determined that the other files besides the third file will not use the currently loaded second mapping table, the storage controller 210 determines that the one or more fifth files do not exist, and there is no need to determine the corresponding another target content.

In simple terms, whenever a new mapping table is loaded from the rewritable non-volatile memory module 220 to the first memory section of the buffer memory 214, the storage controller 210 will determine whether there are files/logical addresses corresponding to this mapping table in the subsequent multiple file read commands to be processed, to determine whether to decide the corresponding target content, so as to avoid repeatedly loading/reading this mapping table in the process of processing subsequent multiple file read commands.

In step S280, the storage controller 210, from the target content, finds a fourth physical address corresponding to a fourth logical address of a fourth file among the one or more second files, to read fourth data of the fourth file from the fourth physical address, so as to respond to a fourth file read command corresponding to the fourth file. That is, in order to process the fourth file read command corresponding to the fourth file (which is one of the second files corresponding to the first mapping table), since it is determined that the target content of the first mapping table corresponding to the fourth logical address of the fourth file already exists in the second memory section of the buffer memory 214, the storage controller 210 will directly find the fourth physical address mapped to the fourth logical address from the target content stored in the second memory section of the buffer memory 214, without needing to load/read the first mapping table from the rewritable non-volatile memory module 220 to the first memory section of the buffer memory 214 again/ repeatedly. By analogy, the file read commands corresponding to all second files/fourth files can use step S280 to obtain the corresponding physical addresses through the target content pre-copied/retained to the second memory section of the buffer memory 214, so as to use the obtained physical addresses to read data, thereby responding to all file read commands of the second files/fourth files, avoiding the problem of repeatedly loading/reading mapping tables.

Figure 4B:
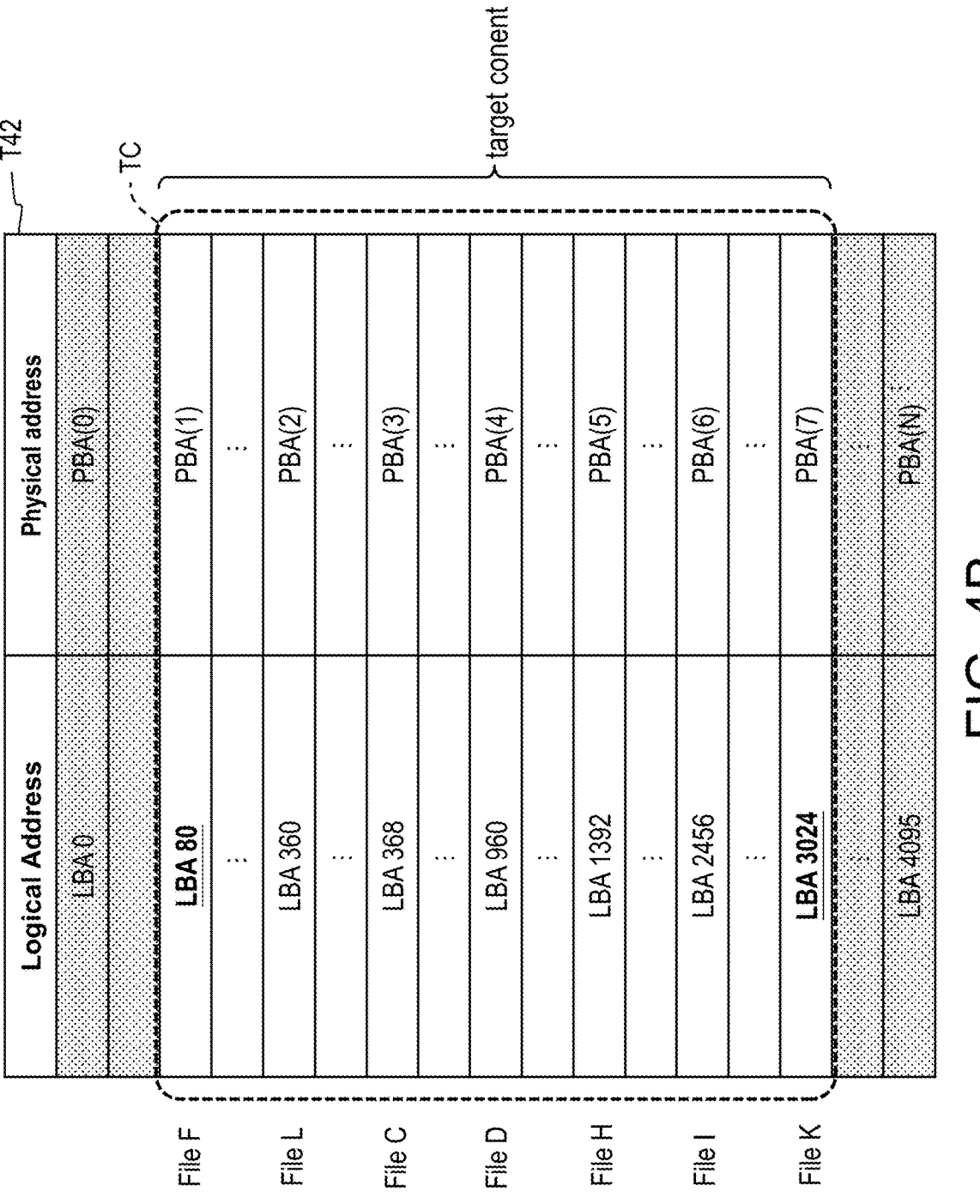
FIG. 4B is a schematic diagram of target content within a mapping table according to an embodiment of the present invention.

The following uses FIG. 3, FIG. 4A, and FIG. 4B to illustrate the progress of the data reading method provided by the present invention compared to the traditional method. Please refer to FIG. 3, assuming that each mapping table can record 4096 logical addresses (LBAs), the specified directory has files A~L, and the corresponding logical addresses are as shown in table T31.

In this example, the storage controller 210 obtains multiple file read commands corresponding to multiple files in the specified directory from the host system 10. Through the traditional data reading method, firstly, the storage controller 210 determines the corresponding mapping table "0" based on the logical address "LBA 2840" of file A according to the file read command corresponding to file A. The storage controller 210 will load/read mapping table "0" from the rewritable non-volatile memory module 220 to the first memory section of the buffer memory 214, and find the physical address corresponding to the logical address "LBA 2840" from the loaded mapping table "0" to obtain the physical address of file A, so as to read the data of file A from the physical address of file A.

Next, the storage controller 210 determines the corresponding mapping table "1" based on the logical address "LBA 7624" of file B according to the file read command corresponding to file B. Since the current mapping table "0" in the buffer memory 214 is not mapping table "1", the storage controller 210 will load/read mapping table "1" from the rewritable non-volatile memory module 220 to the first memory section of the buffer memory 214, overwriting the original mapping table "0", and find the physical address corresponding to the logical address "LBA 7624" from the loaded mapping table "1" to obtain the physical address of file B, so as to read the data of file B from the physical address of file B.

Then, the storage controller 210 determines the corresponding mapping table "0" based on the logical address "LBA 368" of file C according to the file read command corresponding to file C. Since the current mapping table "1" in the buffer memory 214 is not mapping table "0", the storage controller 210 will load/read mapping table "0" from the rewritable non-volatile memory module 220 to the buffer memory 214, overwriting the original mapping table "1". Here, it can be noticed that mapping table "0" is being repeatedly loaded/read. The storage controller 210 finds the physical address corresponding to the logical address "LBA 368" from the loaded mapping table "0" to obtain the physical address of file C, so as to read the data of file C from the physical address of file C.

Next, the storage controller 210 determines the corresponding mapping table "0" based on the logical address "LBA 960" of file D according to the file read command corresponding to file D. Since mapping table "0" has already been loaded into the buffer memory 214, the storage controller 210 can directly find the physical address corresponding to the logical address "LBA 960" from the already loaded mapping table "0" to obtain the physical address of file D, so as to read the data of file D from the physical address of file D, without needing to load mapping table "0" again.

By analogy, in the data reading operation of reading files A~L in the specified directory, a total of 9 times of mapping table reading (performing 9 times of mapping table reading operations) are needed. It should be noted that among the 9 times of mapping table reading operations, 7 times are repeated reading/loading (because mapping table "0" and mapping table "1" have already been read in the first two mapping table reading operations).

However, using the data reading method provided by the present invention can reduce the number of mapping table reads to two times. That is, there will be no repeated reading/loading operations of mapping tables.

For example, please refer to FIG. 4A. As shown in table T41, the storage controller 210 obtains multiple file read commands corresponding to multiple files in the specified directory from the host system 10, and the logical addresses of files A~L in the specified directory are the same as in FIG. 3. In the example of FIG. 4A, firstly, the storage controller 210 determines the corresponding mapping table "0" (e.g., the first mapping table) based on the logical address "LBA 2840" of file A (e.g., the first file) according to the file read command corresponding to file A. The storage controller 210 will load/read mapping table "0" from the rewritable non-volatile memory module 220 to the first memory section of the buffer memory 214, and find the physical address (e.g., the first physical address) corresponding to the logical address "LBA 2840" from the loaded mapping table "0" to obtain the physical address of file A, so as to read the data of file A (e.g., the first data) from the physical address of file A to respond to the file read command corresponding to file A (e.g., the first file read command).

Next, the storage controller 210 identifies the logical addresses (e.g., the second logical addresses) of files C, D, F, H, I, K, L (e.g., the second files) corresponding to mapping table "0" among the multiple files A~L other than file A, and determines the target content in mapping table "0" based on the multiple second logical addresses "LBA 368, LBA 960, LBA 80, LBA 1392, LBA 2456, LBA 3024, LBA 360".

In one embodiment, the storage controller 210 identifies the minimum logical address "LBA 80" and the maximum logical address "LBA 3024" among the second logical addresses "LBA 368, LBA 960, LBA 80, LBA 1392, LBA 2456, LBA 3024, LBA 360", takes the partial content corresponding to logical addresses "LBA 80" to logical address "LBA 3024" in mapping table "0" as the target content, and copies the target content from the first memory section of the buffer memory 214 to the second memory section of the buffer memory 214. Please refer to FIG. 4B, assuming table T42 is mapping table "0", which contains 4096 mapping data of logical addresses "LBA 0"-"LBA 4095" and physical addresses "PBA (0)"-"PBA (N)" mapped to logical addresses "LBA 0"-"LBA 4095". In this example, the target content TC includes the mapping data of logical addresses "LBA 80"-"LBA 3024" and physical addresses "PBA (1)"-"PBA (7)" mapped to logical addresses "LBA 80"-"LBA 3024" in mapping table "0". That is, the physical addresses "PBA (3), PBA (4), PBA (1), PBA (5), PBA (6), PBA (7), PBA (2)" mapped to the logical addresses "LBA 368, LBA 960, LBA 80, LBA 1392, LBA 2456, LBA 3024, LBA 360" of files C, D, F, H, I, K, L can be found from the target content TC.

It is worth mentioning that, in another embodiment, the storage controller 210 directly takes the mapping content corresponding to logical addresses "LBA 80, LBA 360, LBA 368, LBA 960, LBA 1392, LBA 2456, LBA 3024" in mapping table "0" as the target content. As shown in FIG. 4B, this target content, for example, only includes the mapping data of logical addresses "LBA 80, LBA 360, LBA 368, LBA 960, LBA 1392, LBA 2456, LBA 3024" and physical addresses "PBA (1), PBA (2), PBA (3), PBA (4), PBA (5), PBA (6), PBA (7)" mapped to logical addresses "LBA 80, LBA 360, LBA 368, LBA 960, LBA 1392, LBA 2456, LBA 3024" in mapping table "0". Then, the storage controller 210 copies the target content from the first memory section of the buffer memory 214 to the second memory section of the buffer memory 214. That is, the physical addresses "PBA (3), PBA (4), PBA (1), PBA (5), PBA (6), PBA (7), PBA (2)" mapped to the logical addresses "LBA 368, LBA 960, LBA 80, LBA 1392, LBA 2456, LBA 3024, LBA 360" of files C, D, F, H, I, K, L can also be found from the target content. And in this another embodiment, the size of the target content is smaller.

After copying the target content from the first memory section of the buffer memory 214 to the second memory section of the buffer memory 214, the storage controller 210 determines the corresponding mapping table "1" (e.g., the second mapping table) based on the logical address "LBA 7624" (e.g., the third logical address) of file B (e.g., the third file) according to the file read command corresponding to file B. Since the current mapping table "0" in the buffer memory 214 is not mapping table "1", the storage controller 210 will load/read mapping table "1" from the rewritable non-volatile memory module 220 to the first memory section of the buffer memory 214, overwriting the original mapping table "0", and find the physical address (e.g., the third physical address) corresponding to the logical address "LBA 7624" from the loaded mapping table "1" to obtain the physical address of file B, so as to read the data of file B (e.g., the third data) from the physical address of file B to respond to the file read command corresponding to file B (e.g., the third file read command).

Then, the storage controller 210 determines the corresponding mapping table "0" based on the logical address "LBA 368" (e.g., the fourth logical address) of file C (e.g., the fourth file) according to the file read command corresponding to file C. Although the mapping table "1" in the first memory section of the buffer memory 214 is not mapping table "0", because the target content corresponding to mapping table "0" has already been stored in the second memory section of the buffer memory 214, the storage controller 210 can find the physical address (e.g., the fourth physical address) corresponding to the logical address "LBA 368" from the target content in the second memory section of the buffer memory 214, without needing to repeatedly load/read mapping table "0" from the rewritable non-volatile memory module 220 to the first memory section of the buffer memory 214. In this way, after obtaining the physical address of file C, the storage controller 210 can read the data of file C (e.g., the fourth data) from the physical address of file C to respond to the file read command corresponding to file C (e.g., the fourth file read command).

By analogy, for the data reading operations of subsequent files D, F, H, I, K, L, similar to the data reading operation of file C, they will not be described in detail here.

On the other hand, for the file read commands of files E, G, J, since mapping table "1" still exists in the first memory section of the buffer memory 214, the storage controller 210 can directly find the physical addresses corresponding to the logical addresses of files E, G, J from the already loaded mapping table "1" to obtain the physical addresses of files E, G, J, so as to read the data of files E, G, J from the physical addresses of files E, G, J to respond to the file read commands of files E, G, J, without needing to load mapping table "1" again.

As such, from the above process description, it can be known that through the data reading method provided by the embodiment of the present invention, compared with the traditional data reading method, the storage controller 210 can reduce the number of mapping table reads from 9 times to 2 times, while avoiding repeated reading/loading of mapping tables, greatly accelerating the data reading efficiency of the storage device.

Based on the above, the storage device, storage controller, and data reading method used by the storage controller provided by the embodiments of the present invention can effectively avoid the problem of target content being overwritten in subsequent operations of loading other mapping tables by copying the target content of the current mapping table corresponding to the subsequent files of the specified directory. In this way, the physical addresses of other files in the specified directory can be queried through the target content, thus avoiding the trouble of repeatedly loading mapping tables. This innovation reduces the number of times mapping tables are repeatedly read, significantly improves the data reading efficiency of the storage device and storage controller, and rapidly enhances the data reading speed for all files in the specified directory. By adopting this technical means, the storage system can more efficiently handle reading operations for a large number of file directories and the files and directory entries under them. This method not only saves the time for the storage device to load mapping tables but also reduces the reading burden of the system, providing users with a faster and smoother data reading experience. This technological innovation performs excellently in large-scale data reading operations, bringing new progress to the technological development in the storage field.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A storage controller for controlling a storage device configured with a rewritable non-volatile memory module, wherein the storage controller comprises:

a memory interface control circuit, coupled to the rewritable non-volatile memory module, wherein the rewritable non-volatile memory module comprises a plurality of memory dies, wherein each of the memory dies has a plurality of physical blocks, each of the physical blocks has a plurality of physical pages, and the plurality of physical pages correspond to a plurality of physical addresses respectively;

a buffer memory; and a processor, coupled to the memory interface control circuit and the buffer memory, wherein the processor is further coupled to a connection interface circuit of the storage device to be coupled to a host system, wherein the processor is configured to obtain a plurality of file read commands for a plurality of files corresponding to a directory from the host system, wherein the processor is further configured to identify a plurality of logical addresses corresponding to the plurality of files respectively based on the plurality of file read commands, wherein the processor is further configured to determine a plurality of mapping tables corresponding to the plurality of files respectively based on the plurality of logical addresses, wherein the processor is further configured to load a first mapping table corresponding to a first file among the plurality of files from the rewritable non-volatile memory module to a first memory section of the buffer memory, and from the first mapping table, find a first physical address corresponding to a first logical address of the first file, to read first data of the first file from the first physical address, so as to respond to a first file read command corresponding to the first file, wherein the processor is further configured to identify one or more second logical addresses of one or more second files corresponding to the first mapping table among the files other than the first file, wherein the processor is further configured to determine target content of the first mapping table based on the one or more second logical addresses, and copy the target content to a second memory section of the buffer memory, wherein the processor is further configured to, after copying the target content to the second memory section of the buffer memory, load a second mapping table corresponding to a third file among the plurality of files from the rewritable non-volatile memory module to the first memory section of the buffer memory, and from the second mapping table, find a third physical address corresponding to a third logical address of the third file, to read third data of the third file from the third physical address, so as to respond to a third file read command corresponding to the third file, wherein the second mapping table is different from the first mapping table, and the second mapping table overwrites the first mapping table in the buffer memory, wherein the processor is further configured to, from the target content, find a fourth physical address corresponding to a fourth logical address of a fourth file among the one or more second files, to read fourth data of the fourth file from the fourth physical address, so as to respond to a fourth file read command corresponding to the fourth file.

2. The storage controller according to claim 1, wherein in operation of determining the target content of the first mapping table based on the one or more second logical addresses, the processor identifies a minimum second logical address and a maximum second logical address according to the order of the one or more second logical addresses, wherein the processor takes content of a plurality of logical addresses between the minimum second logical address and the maximum second logical address in the first mapping table as the target content.

3. The storage controller according to claim 1, wherein in operation of determining the target content of the first mapping table based on the one or more second logical addresses, the processor takes content corresponding to the one or more second logical addresses in the first mapping table as the target content based on the one or more second logical addresses.

4. The storage controller according to claim 1, wherein in operation of determining the plurality of mapping tables corresponding to the plurality of files respectively based on the plurality of logical addresses, the processor calculates a sequence number of a target mapping table corresponding to a target file based on a predetermined number of logical addresses for each mapping table and a target logical address of the target file among the plurality of files, wherein the processor determines the target mapping table corresponding to the target file based on the sequence number of the target mapping table.

5. The storage controller according to claim 4, wherein in operation of calculating the sequence number of the target mapping table corresponding to the target file, the processor divides the target logical address by the predetermined number of logical addresses to obtain a quotient, wherein the processor takes the obtained quotient as the sequence number of the target mapping table corresponding to the target file.

6. A data reading method for a storage controller to read a rewritable non-volatile memory module, wherein the rewritable non-volatile memory module comprises a plurality of memory dies, wherein each of the memory dies has a plurality of physical blocks, each of the physical blocks has a plurality of physical pages, and the plurality of physical pages correspond to a plurality of physical addresses respectively, the method comprises:

obtaining a plurality of file read commands for a plurality of files corresponding to a directory from the host system;

identifying a plurality of logical addresses corresponding to the plurality of files respectively based on the plurality of file read commands;

determining a plurality of mapping tables corresponding to the plurality of files respectively based on the plurality of logical addresses;

loading a first mapping table corresponding to a first file among the plurality of files from the rewritable non-volatile memory module to a first memory section of a buffer memory of the storage controller, and from the first mapping table, finding a first physical address corresponding to a first logical address of the first file, to read first data of the first file from the first physical address, so as to respond to a first file read command corresponding to the first file;

identifying one or more second logical addresses of one or more second files corresponding to the first mapping table among the files other than the first file;

determining target content of the first mapping table based on the one or more second logical addresses, and copying the target content to a second memory section of the buffer memory;

after copying the target content to the second memory section of the buffer memory, loading a second mapping table corresponding to a third file among the plurality of files from the rewritable non-volatile memory module to the first memory section of the buffer memory, and from the second mapping table, finding a third physical address corresponding to a third logical address of the third file, to read third data of the third file from the third physical address, so as to respond to a third file read command corresponding to the third file, wherein the second mapping table is different from the first mapping table, and the second mapping table overwrites the first mapping table in the buffer memory; and from the target content, finding a fourth physical address corresponding to a fourth logical address of a fourth file among the one or more second files, to read fourth data of the fourth file from the fourth physical address, so as to respond to a fourth file read command corresponding to the fourth file.

7. The data reading method according to claim 6, wherein step of determining the target content of the first mapping table based on the one or more second logical addresses comprises:

identifying a minimum second logical address and a maximum second logical address according to order of the one or more second logical addresses; and taking content of a plurality of logical addresses between the minimum second logical address and the maximum second logical address in the first mapping table as the target content.

8. The data reading method according to claim 6, wherein step of determining the target content of the first mapping table based on the one or more second logical addresses comprises:

taking content corresponding to the one or more second logical addresses in the first mapping table as the target content based on the one or more second logical addresses.

9. The data reading method according to claim 6, wherein step of determining the plurality of mapping tables corresponding to the plurality of files respectively based on the plurality of logical addresses comprises:

calculating a sequence number of a target mapping table corresponding to a target file based on a predetermined number of logical addresses for each mapping table and a target logical address of the target file among the plurality of files; and determining the target mapping table corresponding to the target file based on the sequence number of the target mapping table.

10. The data reading method according to claim 9, wherein step of calculating the sequence number of the target mapping table corresponding to the target file comprises:

dividing the target logical address by the predetermined number of logical addresses to obtain a quotient; and taking the obtained quotient as the sequence number of the target mapping table corresponding to the target file.

11. A storage device, comprising:

a connection interface circuit, configured to be coupled to a host system;

a rewritable non-volatile memory module, wherein the rewritable non-volatile memory module comprises a plurality of memory dies, wherein each of the memory dies has a plurality of physical blocks, each of the physical blocks has a plurality of physical pages, and the plurality of physical pages correspond to a plurality of physical addresses respectively; and a storage controller, coupled to the connection interface circuit and the rewritable non-volatile memory module, wherein the storage controller is configured to obtain a plurality of file read commands for a plurality of files corresponding to a directory from the host system, wherein the storage controller is further configured to identify a plurality of logical addresses corresponding to the plurality of files respectively based on the plurality of file read commands, wherein the storage controller is further configured to determine a plurality of mapping tables corresponding to the plurality of files respectively based on the plurality of logical addresses, wherein the storage controller is further configured to load a first mapping table corresponding to a first file among the plurality of files from the rewritable non-volatile memory module to a first memory section of a buffer memory of the storage controller, and from the first mapping table, find a first physical address corresponding to a first logical address of the first file, to read first data of the first file from the first physical address, so as to respond to a first file read command corresponding to the first file, wherein the storage controller is further configured to identify one or more second logical addresses of one or more second files corresponding to the first mapping table among the files other than the first file, wherein the storage controller is further configured to determine target content of the first mapping table based on the one or more second logical addresses, and copy the target content to a second memory section of the buffer memory, wherein the storage controller is further configured to, after copying the target content to the second memory section of the buffer memory, load a second mapping table corresponding to a third file among the plurality of files from the rewritable non-volatile memory module to the first memory section of the buffer memory, and from the second mapping table, find a third physical address corresponding to a third logical address of the third file, to read third data of the third file from the third physical address, so as to respond to a third file read command corresponding to the third file, wherein the second mapping table is different from the first mapping table, and the second mapping table overwrites the first mapping table in the buffer memory, wherein the storage controller is further configured to, from the target content, find a fourth physical address corresponding to a fourth logical address of a fourth file among the one or more second files, to read fourth data of the fourth file from the fourth physical address, so as to respond to a fourth file read command corresponding to the fourth file.

12. The storage device according to claim 11, wherein in operation of determining the target content of the first mapping table based on the one or more second logical addresses, the storage controller identifies a minimum second logical address and a maximum second logical address according to order of the one or more second logical addresses, wherein the storage controller takes content of a plurality of logical addresses between the minimum second logical address and the maximum second logical address in the first mapping table as the target content.

13. The storage device according to claim 11, wherein in operation of determining the target content of the first mapping table based on the one or more second logical addresses, the storage controller takes content corresponding to the one or more second logical addresses in the first mapping table as the target content based on the one or more second logical addresses.

14. The storage device according to claim 11, wherein in operation of determining the plurality of mapping tables corresponding to the plurality of files respectively based on the plurality of logical addresses, the storage controller calculates a sequence number of a target mapping table corresponding to a target file based on a predetermined number of logical addresses for each mapping table and a target logical address of the target file among the plurality of files, wherein the storage controller determines the target mapping table corresponding to the target file based on the sequence number of the target mapping table.

15. The storage device according to claim 14, wherein in operation of calculating the sequence number of the target mapping table corresponding to the target file, the storage controller divides the target logical address by the predetermined number of logical addresses to obtain a quotient, wherein the storage controller takes the obtained quotient as the sequence number of the target mapping table corresponding to the target file.

\* \* \* \* \*